United States Patent
Wild et al.

(10) Patent No.: US 6,588,257 B1
(45) Date of Patent: Jul. 8, 2003

(54) METHOD FOR CHECKING THE PLAUSIBILITY OF THE MEASURED LOAD IN AN INTERNAL COMBUSTION ENGINE HAVING VARIABLE VALVE LIFT CONTROL

(75) Inventors: Ernst Wild, Oberriexingen (DE); Torsten Bauer, Vaihingen (DE); Stefan Keller, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/889,277
(22) PCT Filed: Oct. 19, 2000
(86) PCT No.: PCT/DE00/03674
  § 371 (c)(1),
  (2), (4) Date: Oct. 16, 2001
(87) PCT Pub. No.: WO01/36800
  PCT Pub. Date: May 25, 2001

(30) Foreign Application Priority Data

Nov. 12, 1999 (DE) .......................................... 199 54 535

(51) Int. Cl.$^7$ .............................................. G01M 15/00
(52) U.S. Cl. ................................................... 73/117.3
(58) Field of Search ........................... 73/116, 117, 118, 73/117.3; 123/438, 198 D, 568.22, 333, 399, 519; 701/69, 101, 111, 110, 114, 65, 29

(56) References Cited

U.S. PATENT DOCUMENTS

| 5,125,384 A | 6/1992 | Tada |
| 5,590,632 A | 1/1997 | Endo et al. |
| 5,987,372 A | * 11/1999 | Wolf et al. ................... 701/69 |

FOREIGN PATENT DOCUMENTS

| DE | 43 15 228 | 11/1994 |
| DE | 43 25 902 | 2/1995 |
| DE | 197 05 766 | 8/1998 |
| DE | 197 50 191 | 3/1999 |
| EP | 0 778 406 | 6/1997 |

* cited by examiner

Primary Examiner—Hezron Williams
Assistant Examiner—Monica D. Harrison
(74) Attorney, Agent, or Firm—Kenyon & Kenyon

(57) ABSTRACT

The plausibility check takes place in such a way that a first piece of load information is derived as a function of the throttle valve position and a differential pressure determined from the pressure upstream of the throttle valve and the pressure downstream of the throttle valve. In addition, a second piece of load information is derived as a function of the intake valve lift and the engine speed. The smaller of the two pieces of load information is compared with the measured load. If this measured load deviates from the load information an error of the measured load is signaled.

6 Claims, 2 Drawing Sheets

METHOD FOR CHECKING THE PLAUSIBILITY OF THE MEASURED LOAD IN AN INTERNAL COMBUSTION ENGINE HAVING VARIABLE VALVE LIFT CONTROL

FIELD OF THE INVENTION

The present invention relates to a method for checking the plausibility of the measured load in an internal combustion engine having variable valve lift control.

BACKGROUND INFORMATION

Such a plausibility check is, for example, practical with torque monitoring in which an acceptable engine torque, which essentially results from the engine speed and the accelerator pedal position, is compared with an actual torque calculated from engine variables. As a rule, these engine variables include the ignition angle, the engine speed and the engine load. In order for the effectiveness of the torque monitoring not to be limited by continuously too little load information, the plausibility of the measured load signal should be checked with regard to an excessively low value. A comparison of load information obtained from the throttle valve position and the engine speed with the measured load is known for a conventional internal combustion engine from European Published Patent Application No. 0 778 406. If the measured load varies from the load information derived the throttle valve position and the engine speed by a specific amount, an incorrect load measurement is assumed and an error correction is initiated accordingly.

SUMMARY OF THE INVENTION

An object of the present invention is now to specify a method of the aforementioned type with which a measured load can also be checked for plausibility in an internal combustion engine having variable valve lift control.

The stated objective is attained in that an initial piece of load information is derived as a function of the throttle valve position and a differential pressure determined from the pressure upstream of the throttle valve and the pressure downstream of the throttle valve in the intake manifold. A second piece of load information is derived as a function of the intake valve lift and the engine speed. The smaller of the two pieces of load information is finally compared with the measured load and an error of the measured load is signaled if it deviates from the load information with which it is compared. With this method according to the present invention, it is taken into account that in addition to the throttle valve, the valve lift control also brings about a throttling effect.

For the event that the determined differential pressure or the intake valve lift is incorrect and thus no throttling is possible via the valves, it is advantageous to derive a third piece of load information as a function of the throttle valve position and the engine speed and then to make a comparison with the third piece of load information for a plausibility check of the measured load.

For a very reliable plausibility check of the measured load, it is advantageous to also check the determined differential pressure and the intake valve lift for plausibility. The plausibility check of the differential pressure is performed in such a way that differential pressure information is derived as a function of the throttle valve position and the engine speed, this information being compared with the determined differential pressure, and an error of the differential pressure is signaled if the determined differential pressure is less than the differential pressure information. The plausibility check of the intake valve lift can be performed in such a way that the second piece of load information derived from the intake valve lift and the engine speed is compared with the measured load or a load derived from the throttle valve position and the intake manifold differential pressure, and an error of the intake valve lift is signaled if the second piece of load information is less than the measured load or a load derived from the throttle valve position and the intake manifold differential pressure.

The first piece of load information is advantageously obtained in such a way that the air mass flow to the throttle valve is read out of an engine characteristics map as a function of the throttle valve position and the differential pressure and that this air mass flow is divided by the engine speed which is multiplied by an engine-specific factor which is a function of the number of cylinders and the piston displacement.

The second piece of load information is advantageously obtained in such a way the air mass flow through the intake valve(s) is read out of an engine characteristics map as a function of the intake valve lift and the engine speed and that this air mass flow is divided by the engine speed which is multiplied by an engine-specific factor which is a function of the number of cylinders and the piston displacement.

DETAILED DESCRIPTION

Figure 1:
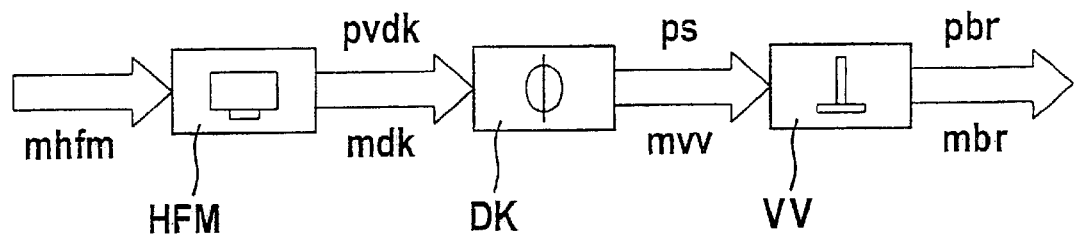
FIG. 1 shows a system representation of the pressures and air mass flows.

FIG. 1 shows a system representation of the pressures and air mass flows in the intake manifold of an internal combustion engine in which an air mass meter (preferably a hot film air mass meter) HFM for load detection, a throttle valve DK and at least one intake valve VV, the lift of which is variably controllable are located. The air mass flow upstream of air mass flow meter HFM is identified as mhfm, the air mass flow upstream of throttle valve DK as mdk, the air mass flow through the at least one intake valve VV as mvv and the air mass flow to the combustion chamber of the engine as mbr. The pressure upstream of throttle valve DK is identified as pvdk, the intake manifold pressure downstream of throttle valve DK as ps and the combustion chamber pressure as pbr. The following relationships may be stated with regard to this system representation of the pressures and air mass flows:

In general, as shown in equation (1), in a steady state, the air mass flows are of equal magnitude through air mass meter HFM, throttle valve DK and through the at least one intake valve VV.

$$mhfm = mdk = mvv = mbr \quad (1)$$

Equation (2) describes air mass flow mdk through throttle valve DK. This air mass flow mdk results from a standard air mass flow mdkn as a function of throttle valve position dk multiplied by a pressure correction factor, a temperature correction factor, and a factor from a throttle valve flow characteristic KLAFDK.

$$mdk = mdkn(dk) \cdot \frac{pvdk}{p0} \cdot \sqrt{\frac{T0}{Tvdk}} \cdot KLAFDK\left(\frac{ps}{pvdk}\right) \quad (2)$$

Standard air mass flow mdkn is the air mass flow through the throttle valve at a defined throttle valve position, a defined temperature T0, and a defined pressure p0 upstream of the throttle valve. The pressure correction factor is the ratio of pressure pvdk upstream of throttle valve DK to pressure p0. The temperature correction factor is the square root of the ratio of temperature T0 to temperature Tvdk upstream of the throttle valve. Factor KLAFDK originates from a throttle valve flow characteristic as a function of the ratio of intake manifold pressure ps downstream of the throttle valve to pressure pvdk upstream of the throttle valve.

Disregarding pressure pvdk upstream of the throttle valve, air mass flow mdk through the throttle valve can also be described as a function of the throttle valve position and of the intake manifold differential pressure.

The air mass flow through the intake valves is described in equation (3).

$$mvv = mvvn(vv) \cdot \frac{ps}{p0} \cdot \sqrt{\frac{T0}{Ts}} \cdot KLAFVV\left(\frac{pbr}{ps}\right) \quad (3)$$

Air mass flow mvv through the valves is the product of a standard air mass flow mvvn through the valves as a function of valve position vv multiplied by a pressure correction factor, a temperature correction factor, and a factor of a valve outlet characteristic KLAFVV. Standard air mass flow mvvn through the valves corresponds to the air mass flow at a defined pressure p0 and a defined temperature T0. The pressure correction factor is the ratio of intake manifold pressure ps downstream of throttle vale DK to pressure p0. The temperature correction factor is the square root of the ratio of temperature T0 to temperature Ts in the intake manifold downstream of throttle valve DK. Factor KLAFVV corresponds to the value of the valve outlet characteristic as a function of the ratio of combustion chamber pressure pbr to intake manifold pressure ps. In first approximation, the valve outlet characteristic can be seen as a measure for the flow velocity of the gas flowing through the at least one intake valve.

Disregarding intake manifold pressure ps, air mass flow mvv through at least one valve can also be regarded as a function of the valve lift and of the engine speed.

Differential pressure dps in the intake manifold is shown in Equation 4, the differential pressure indicating the difference between pressure pvdk upstream of throttle valve DK and pressure ps downstream of the throttle valve. Or expressed in other terms, intake manifold differential pressure dps is equal to the difference between ambient pressure pu and intake manifold pressure ps downstream of throttle valve DK.

$$dps=pvdk-ps=pu-ps \quad (4)$$

Figure 2:
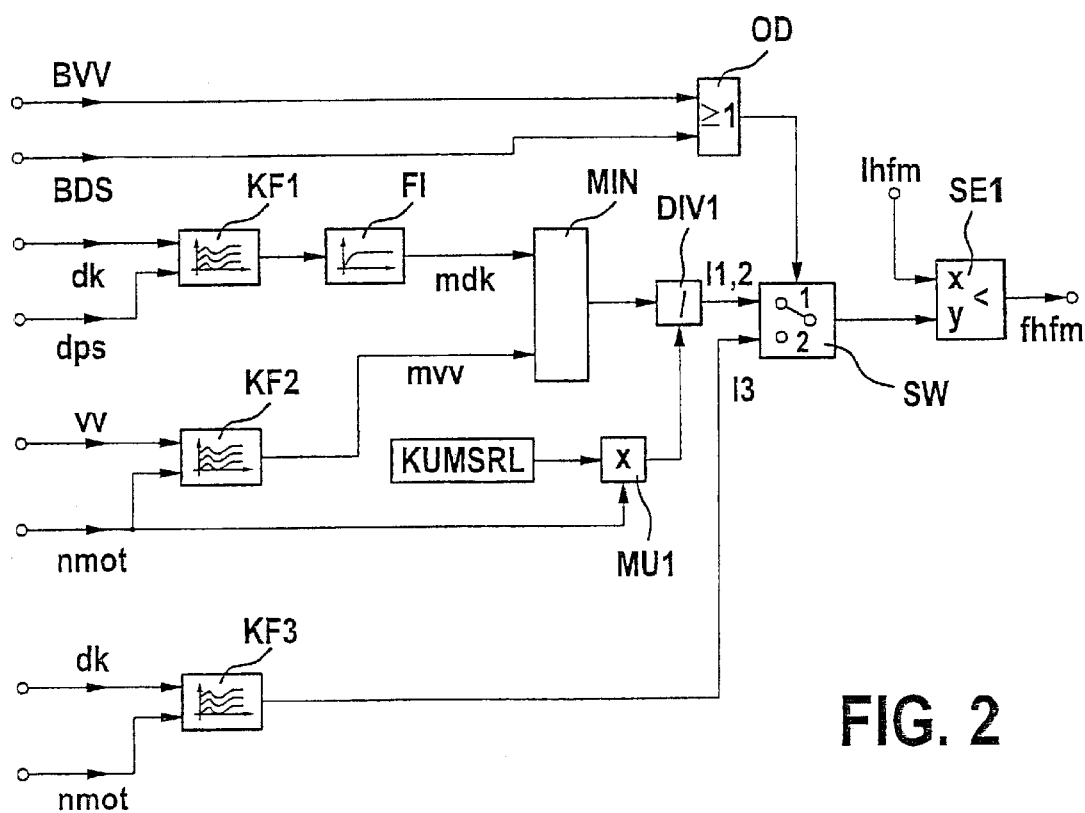
FIG. 2 shows a function diagram for the plausibility check of the measured load.

As the function diagram in FIG. 2 shows, air mass flow mdk to the throttle valve is obtained from a first engine characteristics map KF1 as a function of throttle valve position dk and differential pressure dps. Throttle valve position dk is customarily detected by way of two potentiometers with the result that a plausibility check of throttle valve signal dk is possible. Differential pressure dps arises by measurement of the two pressures pvdk upstream of throttle valve DK and ps downstream of throttle valve DK. The air mass flow read out of the first engine characteristics map KF1 is led across a low-pass filter FI to filter specific dynamic components out of the air mass flow signal which arise with the change of the throttle valve position. Moreover, air mass flow mvv through the at least one intake valve is read out of a second engine characteristics map KF2 as a function of intake valve lift vv and engine speed nmot.

A minimum value MIN of the two air mass flows is formed and the smaller of the two air mass flows mdk, mvv is supplied to a divider DIV1. From the smaller of the two air mass flows mdk, mvv and engine speed nmot, divider DIV1 forms a value which is multiplied in a multiplier MU1 by an engine-specific constant KUMSRL. This engine-specific constant KUMSRL is essentially a function of the number of cylinders and the piston displacement of the engine. The output signal of divider DIV1 then represents a piece of load information 11 or 12. Depending on whether the throttle valve or the at least one intake valve has a greater throttling effect, either a first piece of load information 11 as a function of throttle valve position DK or a second piece of load information 12 as a function of intake valve lift vv is available at the output of divider DIV1.

The first or second piece of load information 11 or 12 is supplied via a switch SW to a threshold value discriminator SE1 if switch SW has assumed its switching position 1. Switch SW is in switching position 1 if neither of the two conditions BVV and BDS present at the inputs of an OR gate OD is met. If condition BVV has the value 1, this means that the at least one intake valve is set to maximum lift; the variable valve control is thus not active and the engine is therefore in conventional operation. If condition BDS has the value 1, this indicates that a pressure sensor error is present and therefore differential pressure dps is incorrect; thus throttling via the valves is no longer possible. Switch SW is thus in switching position 1 and threshold value discriminator SE1 receives either the first or the second piece of load information 11, 12 as an input signal if both conditions BVV and BDS have the value 0, which means that both the variable valve control is functioning properly and the pressure sensor or pressure sensors are measuring a correct differential pressure dps.

Conditions BVV and BDS are derived irrespective of information vv and dps. Information, e.g., feedback from the valve control unit, electrical plausibility checking of the pressure signal, which need not be protected for proper function, is used to generate these conditions BVV and BDS. In the event of an unauthorized setting of condition BVV or BDS to logical 1, throttling via the valves is stopped and conventional error monitoring as described in European Published Patent Application No. 0 778 406 cited above can be performed. If condition BVV or BDS is erroneously not set to logical 0, this is recognized with the plausibility check applied here.

If one of the two conditions BVV or BDS now has the value 1 as the result of an error, the output signal of OR gate OD of switch SW is moved into switching position 2. In this case, a third piece of load information 13 is switched through to threshold value discriminator SE1 via switch SW. The third piece of load information 13 is read out of a third engine characteristics map KF3 as a function of throttle valve position dk and engine speed nmot. Depending on whether the three pieces of load information 11, 12 or 13 are present at threshold value discriminator SE1, it compares the relevant piece of load information 11, 12 or 13 with the load lhfm measured by air mass sensor HFM. If measured load lhfm falls below load information 11 or 12 or 13, then threshold value discriminator SE1 signals an error fhfm of the measured load. Threshold value discriminator SE1 allows, however, a certain tolerance in the deviation of measured load signal lhfm from load information 11, 12 or 13 before it outputs an error signal fhfm.

To be able to perform a correct plausibility check for the measured load the information concerning throttle valve position dk, the information concerning differential pressure dps, and the information concerning valve lift vv are also to be free of errors.

A plausibility check of throttle valve position dk takes place in a known manner by using two potentiometers which measure the throttle valve position. This plausibility check will therefore not be explained in greater detail.

Figure 3:
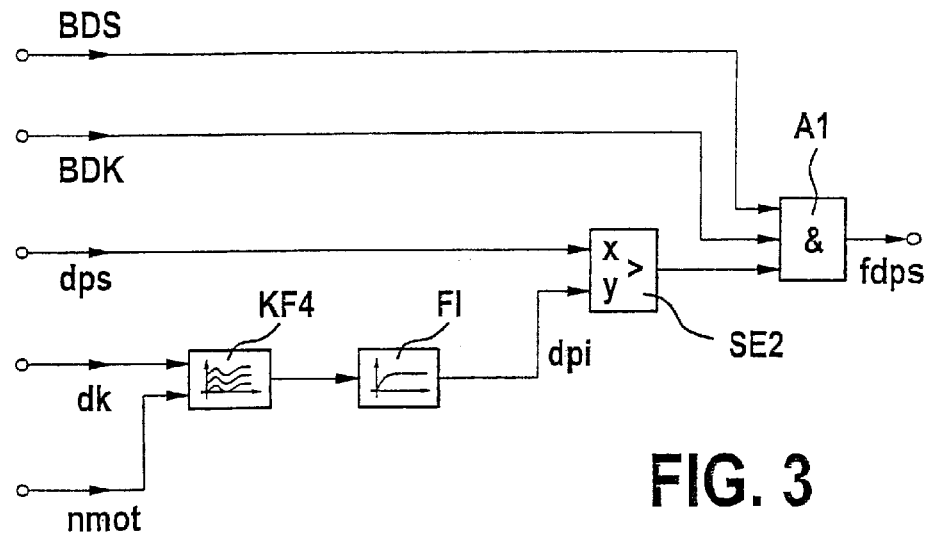
FIG. 3 shows a function diagram for the plausibility check of the measured differential pressure.

The function diagram shown in FIG. 3 depicts a plausibility check for differential pressure dps. In this connection, a threshold value discriminator SE2 compares measured differential pressure dps with a differential pressure dpi obtained from an engine characteristics map KF4 as a function of throttle valve position dk and engine speed nmot. Low-pass filter Fi connected downstream of engine characteristics map KF4 has the same function as low-pass filter Fi shown in FIG. 2, namely to suppress undesirable signal components caused by changes in the throttle valve position. If threshold value discriminator SE2 detects that measured differential pressure dps is greater than differential pressure information dpi, it then signals an error of measured differential pressure dps by outputting a logical 1 to an AND gate A1. An error signal fdps in the form of a logical 1 appears at the output of this AND gate A1 only if two conditions BDS and BDK are also fulfilled simultaneously. Condition BDS has the value 1 if the differential pressure sensor is in proper order and condition BDK has the value 1 if the sensor system operates properly in detecting the throttle valve position. Only if both of these two conditions BDS and BDK are met, does the described plausibility check make sense for differential pressure dps and AND gate A1 should output an error signal fdps only if measured differential pressure dps deviates from differential pressure dpi derived from engine characteristics map KF4 by a specific degree.

The explanation already given in connection with FIG. 2 in relation to conditions BVV and BDS also applies to the two conditions BDS and BDK and their independence from information dps and dk. Electrical signals for checking the plausibility of the intake manifold differential pressure and the throttle valve position can be used to derive conditions BDS and BDK.

Figure 4:
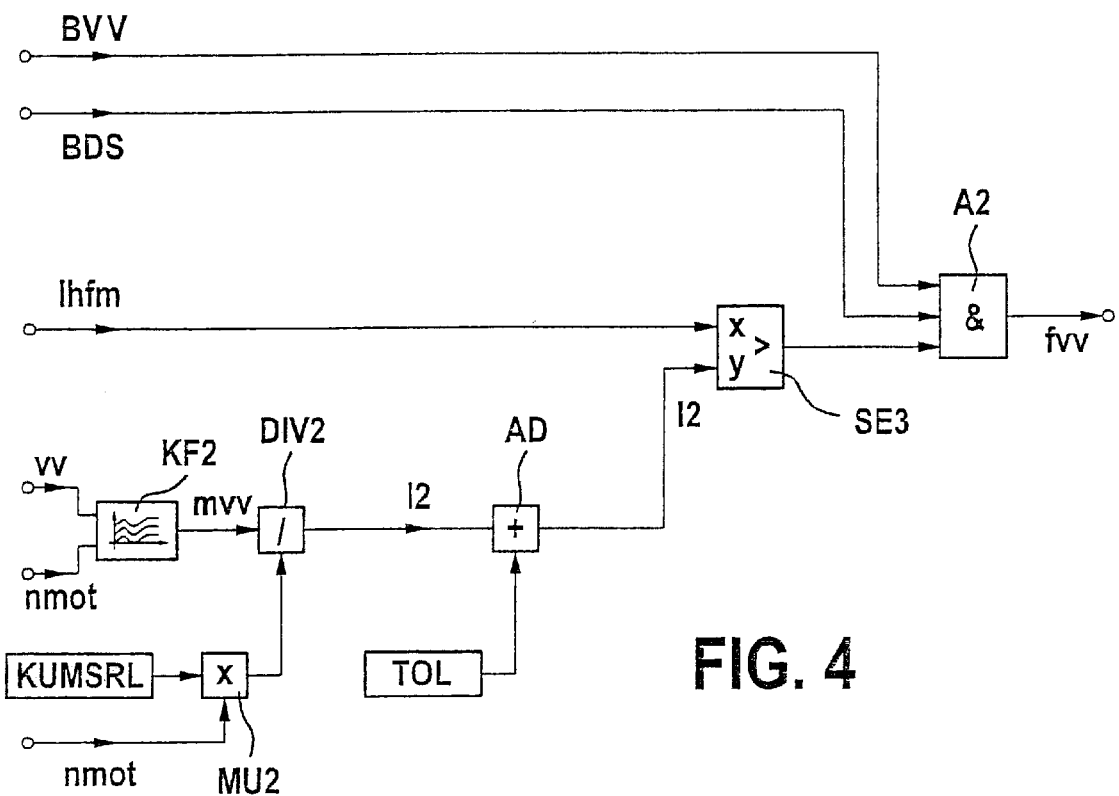
FIG. 4 shows a function diagram for the plausibility check of the inlet valve lift.

The function diagram shown in FIG. 4 illustrates the plausibility check of intake valve lift vv. For this purpose, the second piece of load information 12 derived from intake valve lift vv and engine speed nmot is compared with measured load lhfm by a threshold value discriminator SE3. Load information 12 derived from intake valve lift vv and engine speed nmot is obtained in the same manner as already described in the function diagram of FIG. 2 in that as a function of intake valve lift vv and engine speed nmot, air mass flow mvv through the at least one intake valve is obtained from engine characteristics map KF2 and this air mass flow mvv is divided by divider DIV2 through engine speed nmot to which an engine-specific constant (as a function of number of cylinders, piston displacement) is applied by multiplier MU2. Load information 12 is available at the output of divider DIV2. Before load information 12 at the output of divider DIV2 is supplied to threshold value discriminator SE3, it is increased by an additional tolerance amount TOL by way of an adder AD. Threshold value discriminator SE3 supplies a logical 1 at its output if measured load signal lhfm is greater than load information 12 derived from intake valve lift vv and engine speed nmot. In this case, the intake valve lift is in fact incorrect. Instead of measured load lhfm, a load derived from the throttle valve position and the intake manifold differential pressure may be compared with load information 12.

An AND gate A2 emits a logical 1 from threshold value discriminator SE3 signaling an error as an error signal fvv at its output only if the two conditions BVV and BDS appear simultaneously with a logical 1 at the inputs of AND gate A2 simultaneously. Condition BVV states that, if it has logical condition 1, the valve lift information is in proper order. Condition BDS indicates that, if it is in logical condition 1, the differential pressure sensor is functioning properly.

What is claimed is:

1. A method for checking a plausibility of a measured load in an internal combustion engine including a variable valve lift control, comprising the steps of:

deriving a first piece of load information as a function of a throttle valve position and a differential pressure determined from a pressure upstream of a throttle valve and a pressure downstream of the throttle valve in an intake manifold;

deriving a second piece of load information as a function of an intake valve lift and an engine speed;

selecting a smaller one of the first piece of information and the second piece of information;

comparing the selected smaller one of the first piece of information and the second piece of information with the measured load; and signaling an error in the measured load if the measured load deviates from the selected smaller one of the first piece of load information and the second piece of load information compared thereto.

2. The method according to claim 1, further comprising the steps of:

deriving a third piece of load information as a function of the throttle valve position and the engine speed; and performing a plausibility check of the measured load by performing a comparison with the third piece of load information only if one of the determined differential pressure and the intake valve lift is incorrect.

3. The method according to claim 1, further comprising the steps of:

performing a plausibility check of the determined differential pressure by deriving a piece of differential pressure information as a function of the throttle valve position and the engine speed;

comparing the piece of differential pressure information with the determined differential pressure; and signaling an error in the determined differential pressure if the determined differential pressure is less than the differential pressure information.

4. The method according to claim 1, further comprising the steps of:

performing a plausibility check of the intake valve lift by comparing the second piece of load information with one of the measured load and a load derived from the throttle valve position and an intake manifold differential pressure; and signaling an error in the intake valve lift if the second piece of load information is less than one of the measured load and the load derived from the throttle valve position and the intake manifold differential pressure.

5. The method according to claim 1, wherein the first piece of load information is obtained by performing the steps of:
   reading an air mass flow to the throttle valve out of an engine characteristics map as a function of the throttle valve position and the differential pressure, and
   dividing the air mass flow by the engine speed, the engine speed being multiplied by an engine-specific constant that is a function of a number of cylinders and a piston displacement.

6. The method according to claim 1, wherein the second piece of information is obtained by performing the steps of:
   reading an air mass flow through an intake valve out of an engine characteristics map as a function of the intake valve lift and the engine speed, and
   dividing the air mass flow by the engine speed, the engine speed being multiplied by an engine-specific constant that is a function of a number of cylinders and a piston displacement.

* * * * *